(12) United States Patent
Tojima et al.

(10) Patent No.: US 7,567,046 B2
(45) Date of Patent: Jul. 28, 2009

(54) MOTOR-DRIVING APPARATUS

(75) Inventors: Narifumi Tojima, Yokohama (JP);
Takashi Majima, Yokohama (JP);
Mitsunao Sakamoto, Tokyo (JP);
Tetsuya Fukumoto, Sagamihara (JP)

(73) Assignee: IHI Corporation (JP)

( * ) Notice: Subject to any disclaimer, the term of this patent is extended or adjusted under 35 U.S.C. 154(b) by 180 days.

(21) Appl. No.: 11/577,484

(22) PCT Filed: Oct. 19, 2005

(86) PCT No.: PCT/JP2005/019185

§ 371 (c)(1),
(2), (4) Date: Apr. 18, 2007

(87) PCT Pub. No.: WO2006/043584

PCT Pub. Date: Apr. 27, 2006

(65) Prior Publication Data

US 2008/0089675 A1    Apr. 17, 2008

(30) Foreign Application Priority Data

Oct. 20, 2004  (JP) .............................. 2004-305569

(51) Int. Cl.
H02P 6/08 (2006.01)
(52) U.S. Cl. .................. 318/400.02; 318/432; 318/801; 318/811
(58) Field of Classification Search ............ 318/400.02, 318/432, 254, 437, 800, 801, 811
See application file for complete search history.

(56) References Cited

U.S. PATENT DOCUMENTS 6,664,754 B2 * 12/2003 Misumi ...................... 318/696
6,803,370 B2 * 10/2004 Konradi et al. .............. 514/400

(Continued)

FOREIGN PATENT DOCUMENTS

CN          1462112        12/2003

(Continued)

OTHER PUBLICATIONS

International Search Report PCT/JP2005/019185 dated Jan. 6, 2006 (Japanese Patent Office).

(Continued)

Primary Examiner—Paul Ip
(74) Attorney, Agent, or Firm—Ostrolenk, Faber, Gerb & Soffen, LLP (57) ABSTRACT

An object of the present invention to accurately and reliably detect rotational positions of a rotor irrespective of noise overlapping inductor voltage. Employed for accomplishing the aforementioned object in the present invention is a motor-driving device for rotating and driving a rotor by supplying predetermined drive signals to stator coils each corresponding to each phase of a DC brushless motor, the device comprising: a drive-signal-generating unit for generating the drive signals by switching direct current power based on a pulse-control signal; and a control-signal-generator unit for generating the pulse-control signal that controls the drive-signal-generating unit by intermittently generating the pulse-control signal; and for detecting the rotational position and the rotational velocity of the rotor based on inductor voltage obtained from the stator coils in a period in which generation of the pulse-control signal is suspended in each phase.

16 Claims, 4 Drawing Sheets

U.S. PATENT DOCUMENTS

| | | | |
|---|---|---|---|
| 7,002,307 B2 * | 2/2006 | Yoshitomi et al. | 318/400.29 |
| 7,009,351 B2 * | 3/2006 | Yoshitomi et al. | 318/400.29 |
| 2002/0011816 A1 * | 1/2002 | Misumi | 318/599 |
| 2003/0210006 A1 * | 11/2003 | Kusaka | 318/437 |
| 2005/0225273 A1 * | 10/2005 | Yoshitomi et al. | 318/254 |
| 2006/0001392 A1 * | 1/2006 | Ajima et al. | 318/432 |
| 2006/0038516 A1 * | 2/2006 | Burse | 318/254 |
| 2006/0125437 A1 * | 6/2006 | Kitano | 318/432 |
| 2006/0290216 A1 * | 12/2006 | Burse | 310/90.5 |
| 2007/0093359 A1 * | 4/2007 | Kobayashi et al. | 477/107 |
| 2007/0229004 A1 * | 10/2007 | Fukamizu et al. | 318/254 |
| 2008/0018279 A1 * | 1/2008 | Fukamizu et al. | 318/432 |
| 2008/0067960 A1 * | 3/2008 | Maeda et al. | 318/400.02 |

FOREIGN PATENT DOCUMENTS

| | | |
|---|---|---|
| JP | 9-65678 | 3/1997 |
| JP | H9-266690 | 10/1997 |
| JP | 10-340693 A | 11/1998 |
| JP | 10304693 | 11/1998 |
| JP | 2000-218787 | 8/2000 |
| JP | 2002-78373 A | 3/2002 |
| JP | 2004-242422 A | 8/2004 |

OTHER PUBLICATIONS

Office Action issued by the Chinese Patent Office on Mar. 6, 2009 in connection with corresponding Chinese Patent Application No. 200580043280.3, and attached English translation.

* cited by examiner

MOTOR-DRIVING APPARATUS

CROSS REFERENCE TO RELATED APPLICATION

The present application is a 35 U.S.C. §§371 national phase conversion of PCT/JP2005/019185, filed 19 Oct. 2005, which claims priority of Japanese Patent Application No.P2004-305569 filed 20 Oct. 2004, which is herein incorporated by reference. The PCT International Application was published in the Japanese language.

TECHNICAL FIELD

The present invention relates to a motor-driving apparatus.

BACKGROUND ART

A hundred-and-twenty-degree modulation method and PWM (Pulse Width Modulation) sinusoidal wave modulation method are conventionally known as methods for driving DC brushless motors. Inductor voltage obtained during non-pulse intervals (periods) is used for detecting the rotational position of a DC brushless motor based on the 120-degree modulation method of some type without using position sensors, e.g., rotary encoders, resolvers, and hall elements.

For example, Japanese Unexamined Patent Application, First Publication No. H9-266690 discloses a driving apparatus used in a sensorless DC brushless motor based on the 120-degree modulation method. In order to drive a sensorless DC brushless motor stably, the rotational position of a rotor of a DC brushless motor is measured by detecting zero cross points of inductor voltage obtained in non-pulse intervals (periods) in the driving apparatus.

In addition, Japanese Unexamined Patent Application, First Publication No. 2000-218787 discloses a DC brushless motor driven based on the 120-degree modulation method in which controlling the phase of a driving current conducted in a DC brushless motor prevents non-pulse intervals (periods) from being shortened due to a voltage spike caused by emission of magnetic energy accumulated in motor coils, thereby more stably measuring a cross-section of counter-electromotive voltage produced during the non-pulse intervals and reference voltage, i.e., the rotational position of a rotor.

Patent document 1: Japanese Unexamined Patent Application, First Publication No. H9-266690

Patent Document 2: Japanese Unexamined Patent Application, First Publication No. 2002-218787

DISCLOSURE OF INVENTION

Problems to be Solved by the Invention

The aforementioned conventional technology that detects rotational positions by means of inductor voltage during non-pulse intervals is effective in a rotation range, e.g., several thousand rpm. However, the technology is not effective in a high revolution range, e.g. over several tens of thousand rpm because noise overlapping inductor voltage, and fewer input signal samples destabilize a control circuit, i.e., a digital circuit like a microcomputer. Specifically, the rotational positions of the rotor of a driven DC brushless motor must be accurately detected since higher revolution shortens rotation cycles. However, the inductor voltage cannot be obtained accurately and reliably since higher revolution shortens the non-pulse intervals; and pulse-control signal input into a driving circuit results in noise components, e.g., high frequency components that overlap the inductor voltage obtained during the shortened non-pulse intervals.

In addition, an idea of eliminating the noise by means of filters, e.g., low-pass filters to obtain the inductor voltage is problematic since the phase of the inductor voltage having changed from an original phase due to the usage of the filters provides an error in detecting the rotational positions of the rotor, thereby disturbing accurate detection of the rotational positions. In addition, the error causes an extremely serious problem in significantly changing the revolution of a DC brushless motor driven in the high revolution range over several tens of thousand rpm. Furthermore, another problem is that a design of the wide revolution range filter will be difficult.

Incidentally, extending the non-pulse intervals to control the phase of the driving current as disclosed by Japanese Unexamined Patent Application, First Publication No. 2002-218787 is not effective in the rotation range over several tens of thousand rpm since higher revolution shortens the pulsed intervals.

The present invention was conceived in considering the aforementioned circumstances, and it is an object of the present invention to accurately and reliably detect rotational positions of a rotor irrespective of noise overlapping inductor voltage.

Means for Solving the Problems

Employed for accomplishing the aforementioned object in the present invention is a motor-driving device for rotating and driving a rotor by supplying predetermined drive signals to stator coils each corresponding to each phase of a DC brushless motor, the device including: a drive-signal-generating unit for generating the drive signals by switching direct current power based on a pulse-control signal; and a control-signal-generator unit for generating the pulse-control signal that controls the drive-signal-generating unit by intermittently generating the pulse-control signal and for detecting the rotational position and the rotational velocity of the rotor based on inductor voltage obtained from the stator coils in a period in which generation of the pulse-control signal is suspended in each phase.

Effects of the Invention

The present invention enables a rotational state of a rotor to be accurately and reliably detected since the rotational state of the rotor is detected based on inductor voltage obtained from stator coils during a period wherein generation of a pulse-control signal is suspended; and the pulse-control signal is generated based on the rotational state. Therefore, generating the pulse-control signal based on the thus accurately detected rotational state permits reliably and accurately driving the DC brushless motor.

EXPLANATION OF REFERENCE NUMERALS AND SYMBOLS 1 inverter circuit
2 direct current power source
3 direct current voltage-detecting section
4 alternating current voltage-detecting section
5 and 6 ammeters
7 microcomputer
X 3-phase DC brushless motor
Y turbine
Z compressor

BEST MODE FOR CARRYING OUT THE INVENTION

An embodiment of the present invention will be explained below with reference to the drawings.

Figure 1:
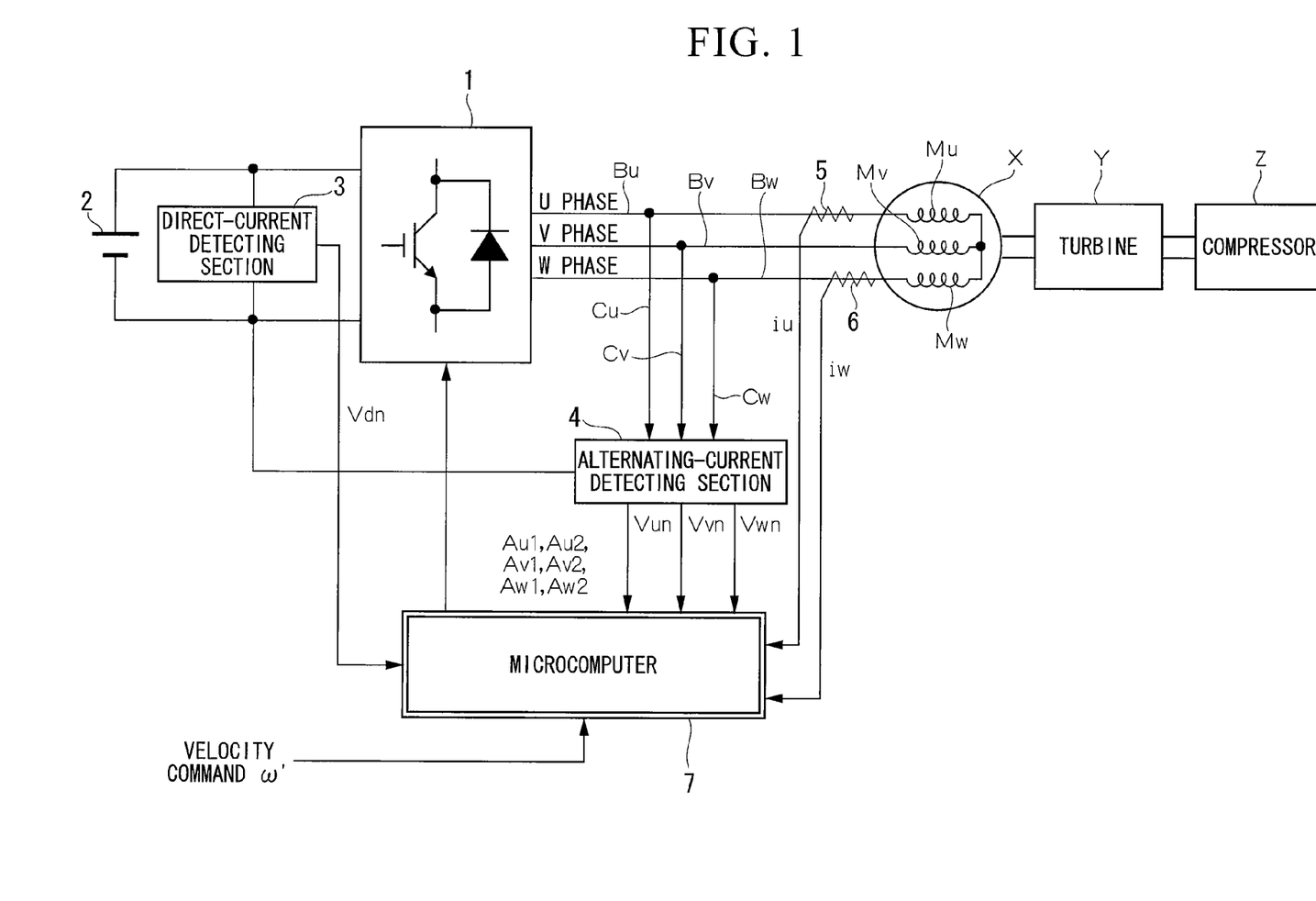
FIG. 1 is a block diagram showing the functional configuration of a motor-driving device and a DC brushless motor subject to be driven according to an embodiment of the present invention.

FIG. 1 is a block diagram showing the functional configuration of a motor-driving device and a DC brushless motor subject to be driven according to the present embodiment. In this drawing, a reference numeral 1 indicates an inverter circuit, 2 indicates a direct current power source, 3 indicates a direct current voltage-detecting section, 4 indicates an alternating current voltage-detecting section, 5 and 6 indicate ammeters, 7 indicates a microcomputer, a reference symbol X indicates a 3-phase DC brushless motor, Y indicates a turbine, and Z indicates a compressor.

Among these components, the inverter circuit 1 and the direct current power source 2 constitute a drive-signal-generating unit according to the present embodiment; and the direct-current voltage-detecting section 3, the alternating-voltage-detecting section 4, the ammeters 5 and 6, and the microcomputer 7 constitute a control-signal-generator unit according to the present invention.

The 3-phase DC brushless motor X that is driven by the motor-driving device includes stator coils including a U phase coil Mu, a V phase coil Mv, and a W phase coil Mw that correspond to three phases including a U-phase, a V phase, and a W phase; and a rotor made of a magnetic-field-permanent magnet. The turbine Y has a rotation shaft that is common and coaxial with a rotation shaft of the 3-phase DC brushless motor X. Externally supplied gas drives and rotates the turbine Y, thereby actuating the compressor Z.

To be more specific, the motor-driving device stops electric power delivery to the 3-phase DC brushless motor X rotated with the driving force supplied by the turbine Y in a relatively low rotation range. When the revolution reaches a high revolution range over several tens of thousand rpm, the motor-driving device in turn starting supplying electric power to the 3-phase DC brushless motor X accelerates the rotational velocity to several hundred thousand rpm. Note that the motor-driving device drives a 3-phase DC brushless motor X based on the PWM sinusoidal wave modulation method.

The inverter circuit 1, including three pairs of serially-connected switching circuits that correspond to 3-phase alternating electric current, switches direct current power based on PWM (Pulse Width Modulation) signals Au1, Au2, Av1, Av2, Aw1, and Aw2 that respectively correspond to three phases, i.e., a U-phase, a V phase, and a W phase as illustrated in the drawing and generates 3-phase driving signals Bu, Bv, and Bw. The driving signals Bu, Bv, and Bw are output from output terminals corresponding to each phase, i.e., a U phase output terminal, a V phase output terminal, and a W phase output terminal.

Each output terminal of the inverter circuit 1 is connected to each stator coil, i.e., a U phase coil Mu, a V phase coil Mv, and a W phase coil Mw of the 3-phase DC brushless motor X. The direct current power source 2 supplies direct current power to the inverter circuit 1 having such a configuration. A semiconductor-switching element, e.g., an Insulated Gate Bipolar Transistor (IGBT), and a free-wheeling diode of reversed polarity connected in parallel to the semiconductor-switching element constitute the above-explained switching circuit.

The direct-current voltage-detecting section 3 is a resistive voltage divider composed by a pair of serial-connected resistors inserted between a reference point n and an input terminal of the inverter circuit 1. Dividing direct current voltage relative to the reference point n input into the inverter circuit 1 by each resistor provides a detected direct current voltage Vdn to be output to the microcomputer 7. The alternating-voltage-detecting section 4 is a resistive voltage divider composed by three pairs of serial-connected resistors inserted between the reference point n and output terminals (a U phase output terminal, a V phase output terminal, and a W phase output terminal) of the inverter circuit 1. Dividing voltage relative to the reference point n output from each output terminal of the inverter circuit 1 by each resistor provides detected alternating voltages Vun, Vvn, and Vwn to be output to the microcomputer 7. In addition, the ammeter 5 detects electric current (U phase current iu) flowing in the U phase coil Mu to output it to the microcomputer 7, and the ammeter 6 detects electric current (W phase current iw) flowing in the W phase coil Mw to output it to the microcomputer 7.

The microcomputer 7 intermittently generates the pulse-control PWM signals Au1, Au2, Av1, Av2, Aw1, and Aw2 corresponding to the PWM sinusoidal wave modulation method based on an externally-input velocity command ω', the above-explained detected direct current voltage Vdn, and the detected alternating voltage Vun, Vvn, and Vwn to supply the generated signals to the inverter circuit 1.

That is, the inverter circuit 1 is controlled by the PWM signals Au1, Au2, Av1, Av2, Aw1, and Aw2 that are sequentially and continuously generated based on a cycle synchronous to the revolution of the 3-phase DC brushless motor X. On the other hand, the process for generating the PWM signals Au1, Au2, Av1, Av2, Aw1, and Aw2 is suspended every one or two rotations during a predetermined period, i.e., an intermission period T based on the operation state of the 3-phase DC brushless motor X. Also, the microcomputer 7 generates the PWM signals Au1, Au2, Av1, Av2, Aw1, and Aw2 by detecting the operation state of the 3-phase DC brushless motor X based on the detected alternating voltages Vun, Vvn, and Vwn obtained during the intermission period T during which the generation of the PWM signals Au1, Au2, Av1, Av2, Aw1, and Aw2 is suspended. The method for setting the above-explained intermission period T will be explained later.

Since the PWM signals Au1, Au2, Av1, Av2, Aw1, and Aw2 are not supplied to the inverter circuit 1 during the above-explained intermission period T, driving signals Bu, Bv, and Bw are not output to each output terminal of the inverter circuit 1, i.e., the 3-phase DC brushless motor X is in a non-pulsed state. Therefore, voltage induced at each output terminal of the inverter circuit 1 become induced voltage Cu, Cv, and Cw induced by the rotor of the 3-phase DC brushless motor X at the stator coils, i.e., the U phase coil Mu, the V phase coil Mv, and the W phase coil Mw.

Specifically, the detected alternating voltages Vun, Vvn, and Vwn output from the alternating-voltage-detecting section 4 during the intermission period T are based not on the driving signals Bu, Bv, and Bw but on the induced voltage Cu, Cv, and Cw.

Figure 2:
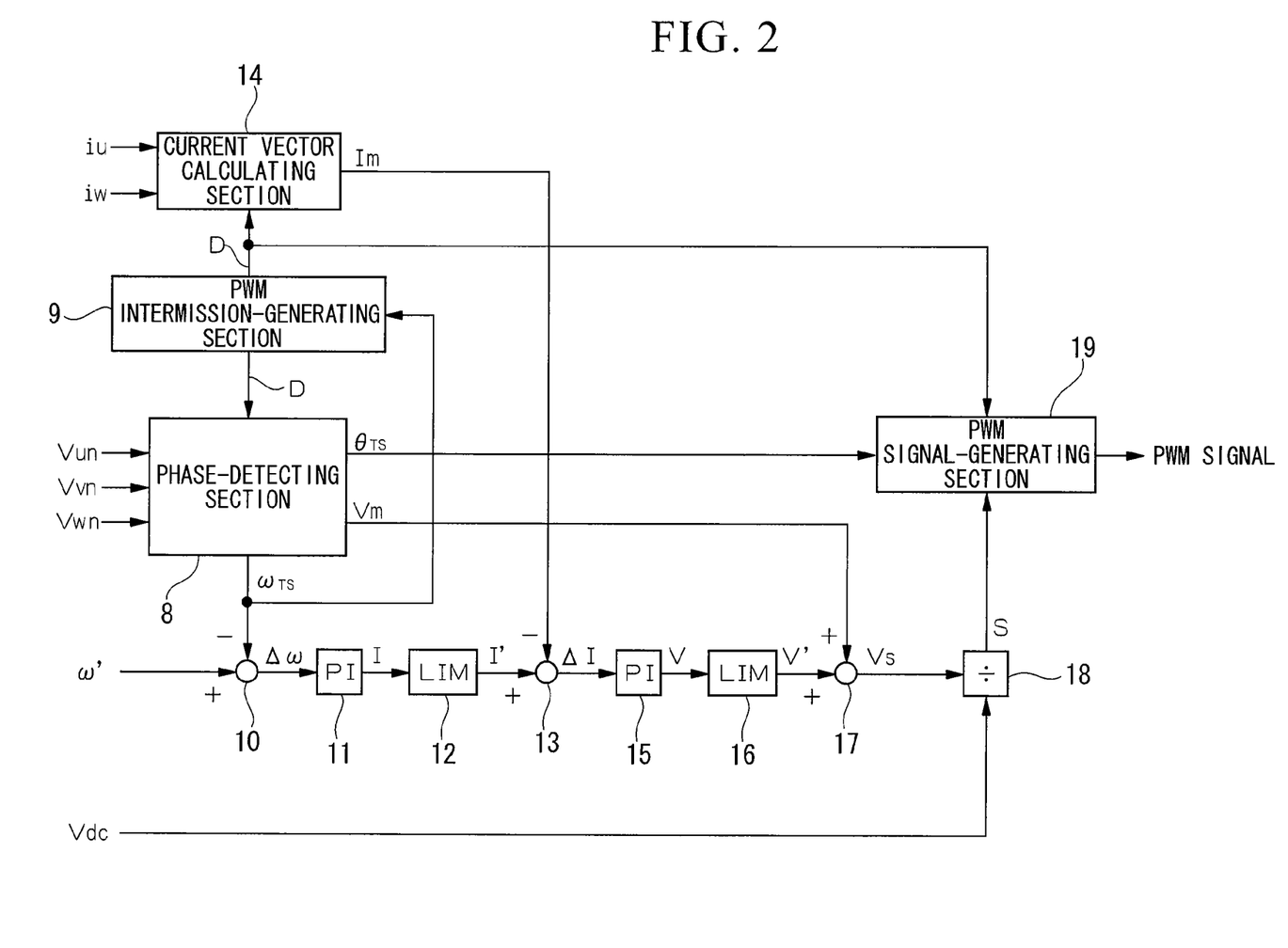
FIG. 2 is a control block diagram describing control operation conducted by a microcomputer 7 according to an embodiment of the present invention.
Figure 3:
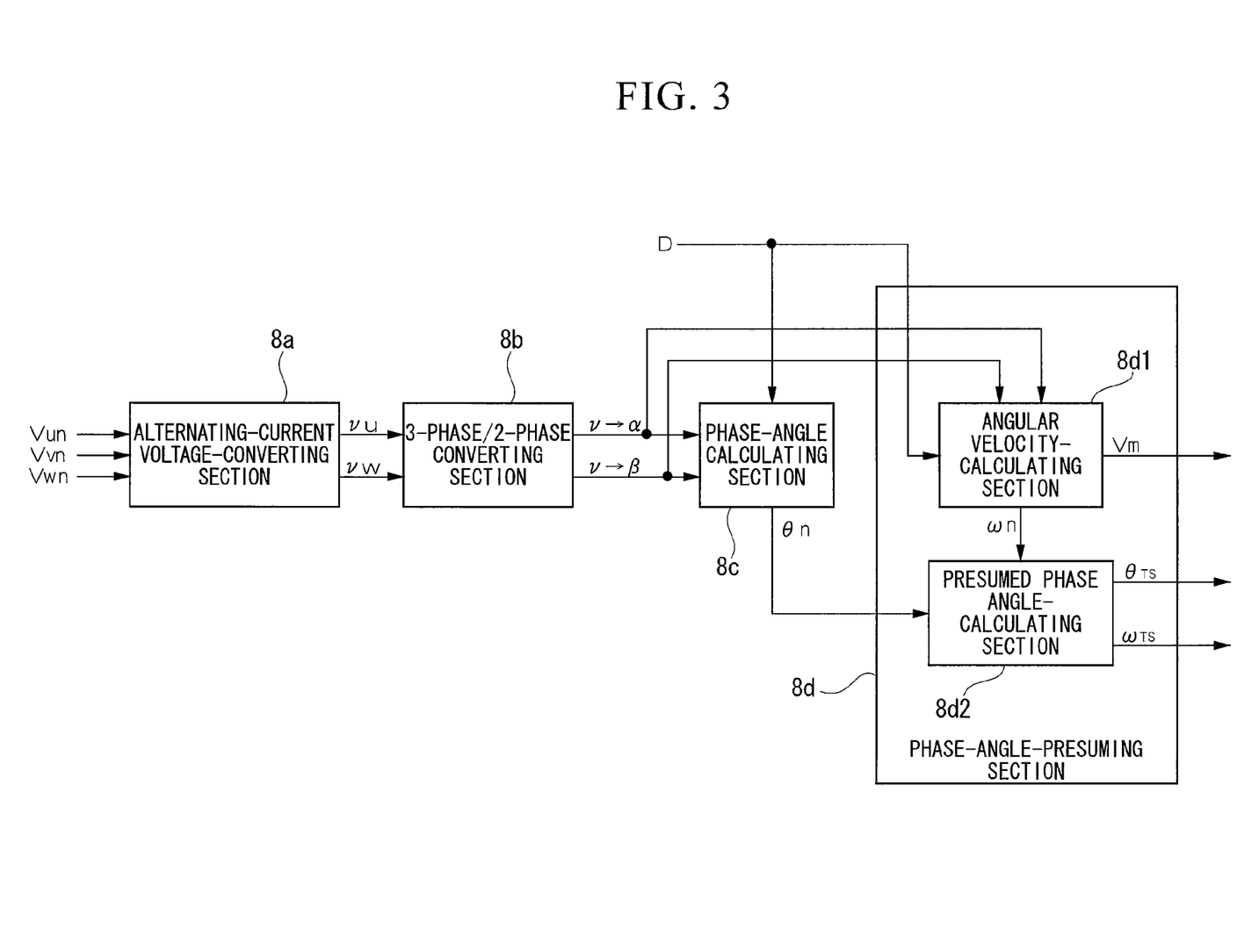
FIG. 3 is a control block diagram describing in detail a phase-detecting section illustrated in FIG. 2.
Figure 4:
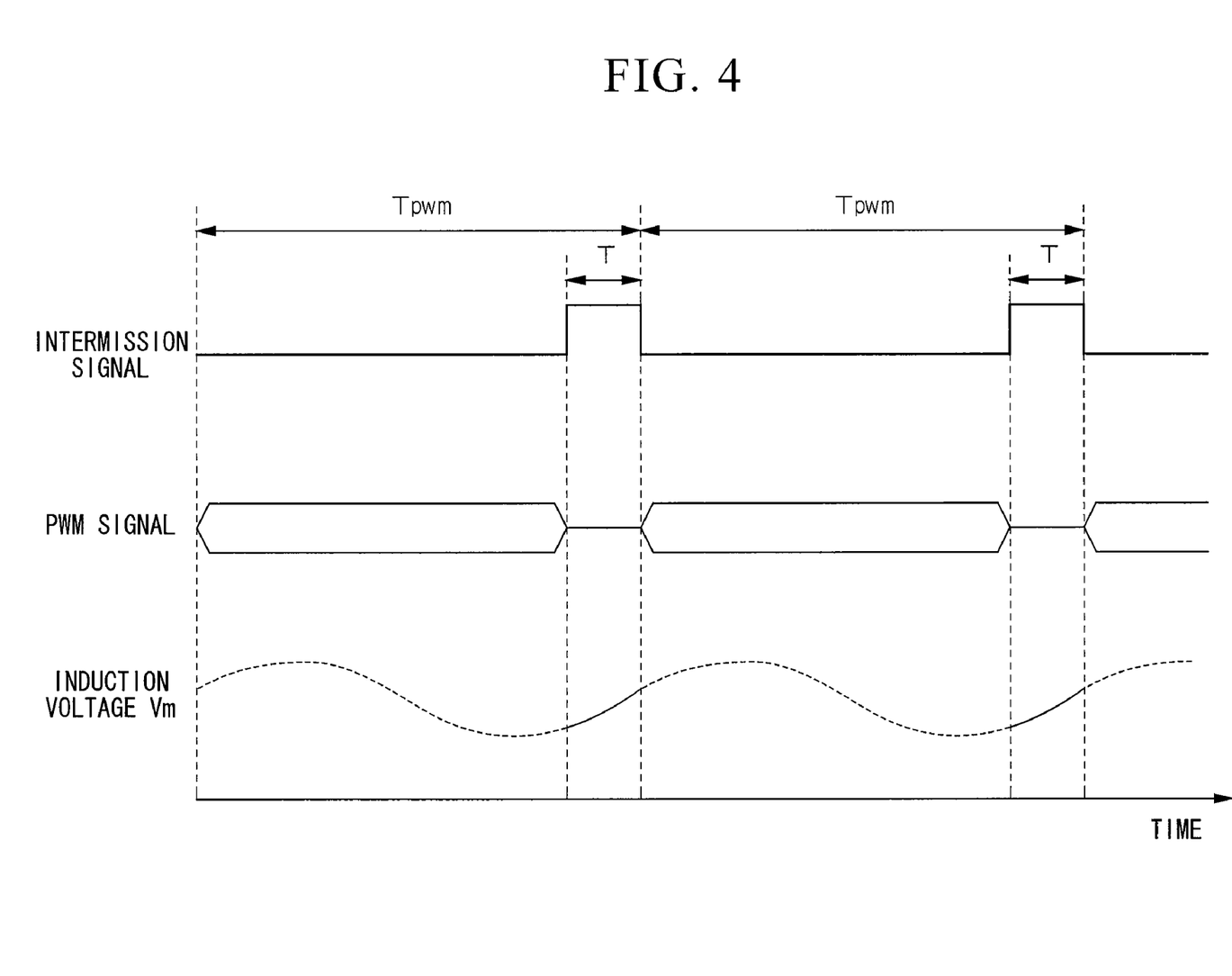
FIG. 4 is a timing diagram illustrating operation timing of the motor-driving device according to an embodiment of the present invention.

Explained next with reference to FIGS. 2 to 4 is a comprehensive operation of the motor-driving device having such a configuration.

FIG. 2 is a control block diagram explaining the control function of the microcomputer 7. The control function is brought into practice by a control program written in the microcomputer 7. As illustrated in the drawing, the control function of the microcomputer 7 consists of: a phase-detecting section 8; a PWM (Pulse Width Modulation) intermission period-generating section 9; subtractor sections 10 and 13; PI gain-setting sections 11 and 15; limiters 12 and 16; a direct-detecting section 14; an adder section 17; a divider section 18; and a PWM (Pulse Width Modulation) signal-generating section 19. The microcomputer 7 controls the inverter circuit 1 based on the control function having such structure.

The phase-detecting section 8 calculates an angular velocity $\omega_{TS}$, a presumed phase angle value $\theta_{TS}$, and an inductor voltage Vm of the rotor of the 3-phase DC brushless motor X based on the detected alternating voltage Vun, Vvn, and Vwn supplied by the alternating-voltage-detecting section 4. As illustrated in FIG. 3, its structure consists of a alternating-voltage-converting section 8a, a 3-phase/2-phase converting section 8b, a phase angle-calculating section 8c, and a phase angle-presuming section 8d. The structure of the phase angle-presuming section 8d consists of an angular velocity-calculating section 8d1 and an estimated phase angle-divider section 8d2.

The alternating-voltage-converting section 8a calculates a U phase voltage Vu and a W phase voltage Vw by substituting the above-explained detected alternating voltages Vun, Vvn, and Vwn in equations (1) to (4) to supply them to the 3-phase/2-phase converting section 8b.

$$Vuv = Vun - Vvn \qquad (1)$$

$$Vwv = Vwn - Vvn \qquad (2)$$

$$vu = 0.6666 Vuv - 0.3333 Vvn \qquad (3)$$

$$vw = 0.6666 Vwv - 0.3333 Vvn \qquad (4)$$

The 3-phase/2-phase converting section 8b calculates an α-axis voltage $V_\alpha$ and a β-axis voltage $V_\beta$ on a static rectangular coordinate system (a rectangular coordinate system having an α axis and a β axis) fixed on the rotor by substituting the above-explained U phase voltage Vu and the W phase voltage Vw in the following equation (5); thus, the obtained voltages are supplied to the phase angle-calculating section 8c and the angular velocity-calculating section 8d1.

$$\begin{bmatrix} v_\alpha \\ v_\beta \end{bmatrix} = \begin{bmatrix} \sqrt{3/2} & 0 \\ -\sqrt{2}/2 & -\sqrt{2} \end{bmatrix} \begin{bmatrix} v_u \\ v_w \end{bmatrix} \qquad (5)$$

The intermission signal D indicating the above-explained intermission period T is supplied from a PWM intermission period-generating section 9 to the phase angle-calculating section 8c that calculates an instantaneous phase angle $\theta_n$ in the intermission period T based on the intermission signal D, the α-axis voltage $V_\alpha$, and the β-axis voltage $V_\beta$. That is, the phase angle-calculating section 8c calculates the instantaneous phase angle $\theta_n$ and supplies it to the estimated phase angle-divider section 8d2 by substituting the α-axis voltage Vα and the β-axis voltage Vβ in the following equation (6) only during the intermission period T.

The instantaneous phase angle $\theta_n$ indicates the accurate rotational position of the rotor based on the induced voltages Cu, Cv, and Cw since the detected alternating voltages Vun, Vvn, and Vwn in the intermission period T are obtained by dividing the induced voltages Cu, Cv, and Cw. It should be noted that the instantaneous phase angle $\theta_n$ reasonably indicates an instantaneous value of a rotational angle of the rotor on the above-explained static rectangular coordinate system since the instantaneous phase angle $\theta_n$ is calculated based on the α-axis voltage $V_\alpha$ and the β-axis voltage $V_\beta$.

$$\theta_n = \tan^{-1}(v_\beta/v_\alpha) \qquad (6)$$

The above-explained intermission signal D is also supplied from the PWM intermission period-generating section 9 to the angular velocity-calculating section 8d1 that substitutes the above-explained α-axis voltage $V_\alpha$ and the β-axis voltage $V_\beta$ in the following equation (7), calculates an inductor voltage Vm in the intermission period T, and thereby outputs the calculated voltage to the adder section 17. Simultaneously, the angular velocity-calculating section 8d1 substitutes the inductor voltage Vm in the intermission period T in the following equation (8), calculates an angular velocity $\omega_n$ of the rotor in the intermission period T, and thereby supplies the calculated velocity to the estimated phase angle-divider section 8d2 and the adder section 17. A constant Ke in the equation (8) indicates an inductor voltage constant.

$$V_m = \sqrt{v_\alpha^2 + v_\beta^2} \qquad (7)$$

$$\omega_n = V_m / K_e \qquad (8)$$

The estimated phase angle-divider section 8d2 calculates an estimated value (an estimated instantaneous phase angle $\theta_{TS}$) of an instantaneous phase angle in a period from an intermission period T to a next intermission period T and supplies the calculated value to the PWM signal-generating section 19 by substituting an instantaneous phase angle θ of the rotor in the intermission period T supplied from the phase angle-calculating section 8c and an angular velocity $\omega_n$ of the rotor in the intermission period T supplied from the angular velocity-calculating section 8d1 in the following equations (9) to (12).

To be more specific, the estimated phase angle-divider section 8d2 calculates the latest value of acceleration a of the rotor by substituting an angular velocity o $\omega_n$ obtained from a currently latest intermission period T and another angular velocity $\omega_{n-1}$ obtained from the previous intermission period T in the following equation (9). The constant Tpwm in the equation (9) indicates a cycle (PWM intermission cycle) at which the intermission period T is generated. The PWM intermission cycle Tpwm is variably set by the PWM intermission period-generating section 9.

$$\alpha = (\omega_n - \omega_{n-1})/T_{pwm} \qquad (9)$$

where $\omega_n$ indicates a currently latest PWM intermission period, and $\omega_{n-1}$ indicates a previous PWM intermission period Furthermore, the estimated phase angle-divider section 8d2 using the equation (10) integrates the acceleration an obtained based on the equation (9) and determines a estimated instantaneous angular velocity (compensated estimated instantaneous angular velocity $\omega_{TS}$) where an initial value is an angular velocity $\omega_n$ per every sampling cycle Ts of the detected alternating voltage Vun, Vvn, and Vwn in the microcomputer 7. The estimated phase angle-divider section 8d2 using the equation (11) further substitutes the obtained compensated estimated instantaneous angular velocity $\omega_{TS}$ in the equation (11) and integrates the substituted velocity to calculate the estimated instantaneous phase angle $\theta_{TS}$. An initial value of the integration is an instantaneous phase angle $\theta_{TS}$.

$$\omega_{TS} = \int \alpha \cdot dTs \quad (10)$$

where an initial value of the integration is $\omega_n$ $$\theta_{TS} = \int \omega_{TS} \cdot dTs \quad (11)$$

where an initial value of the integration is $\theta_n$

The PWM intermission period-generating section 9 sets the above-explained intermission period T based on the angular velocity $\omega_{TS}$ supplied from the phase-detecting section 8, and generates the above-explained intermission signal D for instructing the intermission period T that is supplied to the phase-detecting section 6, the a direct-current-detecting section 14, and the PWM signal-generating section 19. That is, the PWM intermission period-generating section 9 outputting the intermission signal D indicating the timing of such intermission period T determines whether or not the 3-phase DC brushless motor X is in an accelerated state based on the change in the angular velocity ω supplied from the phase-detecting section 6 every intermission period T. The PWM intermission period-generating section 9 sets the intermission period T every one revolution of the rotor in the accelerated state, and sets one intermission period T every two revolutions of the rotor in a constant velocity state.

Since the intermission period T is set at every one or two rotations of the rotor based on whether or not the 3-phase DC brushless motor X is in the accelerated state, the generation cycle, i.e., the above-explained PWM intermission cycle Tpwm varies based on the rotational velocity of the rotor. In addition, the duration of the intermission period T is set at a predetermined angular region, e.g., a time corresponding to 30 degrees with respect to one revolution (360 degrees) of the rotor; thus, the duration varies based on the rotational velocity of the rotor.

Incidentally, the PWM intermission period-generating section 9 eliminates the reflux period of each free-wheeling diode constituting the inverter circuit 1 when the timing of the intermission period T is set; thus, influence of the reflux current during the reflux period is eliminated.

The subtractor section 10 calculates a velocity error Δω of the angular velocity ω of the rotor with respect to the velocity command ω' by subtracting the angular velocity $\omega_{TS}$ of the rotor supplied from the angular velocity-calculating section 8*d*2 (estimated phase angle-divider section 8*d*2) from the externally supplied velocity command ω', thus the calculated velocity is supplied to a PI gain-setting section 11. The PI gain-setting section 11 generates and supplies electric current I to a limiter 12 by conducting a proportional-integral process by means of a predetermined PI gain with respect to the above-explained velocity error Δω. The limiter 12 supplies electric current I' to the subtractor section 13 by limiting the above-explained electric current I within a predetermined limited value. The subtractor section 13 generates and supplies error current ΔI to the PI gain-setting section 15 by subtracting induced electric current Im supplied from the a direct-current-detecting section 14 from the above-explained electric current I'.

The a direct-current-detecting section 14 calculates α axis electric current $I_\alpha$ and β axis electric current $I_\beta$ on the static rectangular coordinate system, i.e., a rectangular coordinate system having an α axis and a β axis fixed on the stator by substituting the U phase current iu supplied from the ammeter 5 and the W phase current iw supplied from the ammeter 6 in the following equation (12). The a direct-current-detecting section 14 further calculates and supplies an induction electric current Im to the above-explained subtractor section 13 by substituting the α axis electric current $I_\alpha$ and the β axis electric current $I_\beta$ in the following equation (13).

$$\begin{bmatrix} i_\alpha \\ i_\beta \end{bmatrix} = \begin{bmatrix} \sqrt{3/2} & 0 \\ -\sqrt{2}/2 & -\sqrt{2} \end{bmatrix} \begin{bmatrix} i_u \\ i_w \end{bmatrix} \quad (12)$$

$$I_m = \sqrt{i_\alpha^2 + i_\beta^2} \quad (13)$$

The PI gain-setting section 15 generates and supplies voltage V to a limiter 16 by conducting proportional-integral process by means of a predetermined PI gain with respect to the above-explained error electric current ΔI. The limiter 16 supplies voltage V' to an adder section 17 by limiting the voltage V within a predetermined limited value. The adder section 17 generates and supplies voltage Vs to a divider section 18 by adding inductor voltage Vm supplied from the angular velocity-calculating section 8*d*1 to the voltage V'. The divider section 18 generates and supplies a velocity control value S to the PWM signal-generating section 19 by subtracting the detected direct current voltage Vdn supplied from the direct-current voltage-detecting section 3 from the voltage Vs.

The PWM signal-generating section 19 generates and supplies the PWM signals Au1, Au2, Av1, Av2, Aw1, and Aw2 to the inverter circuit 1 based on the above-explained velocity control value S and the estimated instantaneous phase angle $\theta_{TS}$ as an angle control value supplied from the estimated phase angle-divider section 8*d*2. Based on the intermission signal D supplied from the PWM intermission period-generating section 9 to the PWM signal-generating section 19, the PWM signal-generating section 19 conducts a process for generating the PWM signals Au1, Au2, Av1, Av2, Aw1, and Aw2 except in the intermission period T, and suspends the process for generating the PWM signals Au1, Au2, Av1, Av2, Aw1, and Aw2 during the intermission period T.

FIG. 4 is a timing diagram explaining the relationship between the intermission period T in the accelerated state of the 3-phase DC brushless motor X and the timing for generating the PWM signals Au1, Au2, Av1, Av2, Aw1, and Aw2. The PWM intermission period-generating section 9 sets the intermission period T at every one revolution of the rotor if it is determined that the 3-phase DC brushless motor X is in the accelerated state based on the angular velocity $\omega_{TS}$ supplied from the phase-detecting section 6 at every intermission period T.

The fluctuating cycle of the inductor voltage Vm is the same as the revolution cycle of the rotor since the sinusoidal inductor voltage Vm varies synchronously with the revolution of the rotor. The PWM intermission period-generating section 9 sets the intermission period T having a predetermined duration, by every one revolution of the rotor, i.e., every fluctuating cycle of the inductor voltage Vm when the 3-phase DC brushless motor X is in the accelerated state, and the PWM signal-generating section 19 accordingly suspends the generation of the PWM signals Au1, Au2, Av1, Av2, Aw1, and Aw2 during the intermission period T.

In contrast, the inductor voltage Vm, the angular velocity ω, and the estimated instantaneous phase angle $\theta_{TS}$ indicate the rotational state of the rotor accurately since the phase-detecting section 8 calculates the inductor voltage Vm, the angular velocity ω, and the estimated instantaneous phase angle $\theta_{TS}$ in the intermission period T based on the detected alternating voltage Vun, Vvn, and Vwn, and since noise caused by generated PWM signals Au1, Au2, Av1, Av2, Aw1, and Aw2 does not act as disturbance, Therefore, the velocity control value S calculated based on such inductor voltage Vm and angular velocity ω accurately represent the rotational state of the rotor; and also the estimated instantaneous phase angle $\theta_{TS}$ is the angle control value accurately representing the rotational state of the rotor; and the PWM signals Au1, Au2, Av1, Av2, Aw1, and Aw2 generated except in the intermission period T based on the angle control value and the velocity control value S appropriately controls the inverter circuit 1 and reliably and accurately drives the 3-phase DC brushless motor X. The motor-driving device therefore allows accurate and reliable detection of the rotational position of the rotor, thereby driving the 3-phase DC brushless motor X accurately and reliably.

In addition, the present invention is not limited to the above embodiment; for example, the following modification may be available.

(1) The present invention is not limited to the above-explained embodiment in which the 3-phase DC brushless motor X in the motor-driving device is driven based on the PWM sinusoidal wave modulation method; thus the present invention may be applied to a case in which the 3-phase DC brushless motor X is driven based on the 120-degree modulation method.

(2) The method for setting the intermission period T is not limited to the above-explained embodiment in which the PWM intermission period-generating section 9 sets the intermission period T every one rotation of the rotor if the 3-phase DC brushless motor X is in an accelerated state, and sets the intermission period T every two rotations of the rotor if the 3-phase DC brushless motor X is in a constant velocity state. The method for setting the intermission period T may be changed based on operation capability requirement with respect to the 3-phase DC brushless motor X.

(3) The configuration with respect to the drive-signal-generating unit and the control-signal-generator unit may not be limited to the above-explained embodiment in which the inverter circuit 1 and the direct current power source 2 constitute the drive-signal-generating unit, and also the direct-current voltage-detecting section 3, the alternating-voltage-detecting section 4, the ammeters 5 and 6, and the microcomputer 7 constitute the control-signal-generator unit. In particular, the control method is not limited to PWM control on the inverter circuit 1 conducted by the microcomputer 7 according to the above-explained embodiment.

(4) The advantage of the present invention is not limited to operation conducted in a high revolution range in which the 3-phase DC brushless motor X is actuated over several tens of thousand rpm.

What is claimed is:

1. A motor-driving device for rotating and driving a rotor by supplying predetermined drive signals to stator coils each corresponding to each phase of a DC brushless motor, the device comprising:
a drive-signal-generating unit for generating the drive signals by switching direct current power based on a pulse-control signal; and
a control-signal-generator unit for generating the pulse-control signal that controls the drive-signal-generating unit by intermittently generating the pulse-control signal; and for detecting the rotational position and the rotational velocity of the rotor based on inductor voltage obtained from the stator coils in a period in which generation of the pulse-control signal is suspended in each phase.

2. The motor-driving device according to claim 1, wherein the drive-signal-generating unit is composed of a direct current power source and an inverter circuit for generating a drive signal by switching the direct current power based on the pulse-control signal.

3. The motor-driving device according to claim 1, wherein the control-signal-generator unit generates pulse-control PWM (Pulse Width Modulation) signals.

4. The motor-driving device according to claim 2, wherein the control-signal-generator unit generates pulse-control PWM (Pulse Width Modulation) signals.

5. The motor-driving device according to claim 1, wherein when a free-wheeling diode is connected in parallel to a switching element of a drive-signal-generating unit, the control-signal-generator unit detects the rotational state of the rotor in a period in which the generation of the pulse-control signal is suspended based on signals obtained from the stator coils except in a reflux period of the free-wheeling diode.

6. The motor-driving device according to claim 2, wherein when a free-wheeling diode is connected in parallel to a switching element of a drive-signal-generating unit, the control-signal-generator unit detects the rotational state of the rotor in a period in which the generation of the pulse-control signal is suspended based on signals obtained from the stator coils except in a reflux period of the free-wheeling diode.

7. The motor-driving device according to claim 3, wherein when a free-wheeling diode is connected in parallel to a switching element of a drive-signal-generating unit, the control-signal-generator unit detects the rotational state of the rotor in a period in which the generation of the pulse-control signal is suspended based on signals obtained from the stator coils except in a reflux period of the free-wheeling diode.

8. The motor-driving device according to claim 4, wherein when a free-wheeling diode is connected in parallel to a switching element of a drive-signal-generating unit, the control-signal-generator unit detects the rotational state of the rotor in a period in which the generation of the pulse-control signal is suspended based on signals obtained from the stator coils except in a reflux period of the free-wheeling diode.

9. The motor-driving device according to claim 1, wherein the control-signal-generator unit generates a pulse-control signal corresponding to a PWM sinusoidal wave modulation method.

10. The motor-driving device according to claim 2, wherein the control-signal-generator unit generates a pulse-control signal corresponding to a PWM sinusoidal wave modulation method.

11. The motor-driving device according to claim 3, wherein the control-signal-generator unit generates a pulse-control signal corresponding to a PWM sinusoidal wave modulation method.

12. The motor-driving device according to claim 4, wherein the control-signal-generator unit generates a pulse-control signal corresponding to a PWM sinusoidal wave modulation method.

13. The motor-driving device according to claim 5, wherein the control-signal-generator unit generates a pulse-control signal corresponding to a PWM sinusoidal wave modulation method.

14. The motor-driving device according to claim 6, wherein the control-signal-generator unit generates a pulse-control signal corresponding to a PWM sinusoidal wave modulation method.

15. The motor-driving device according to claim 7, wherein the control-signal-generator unit generates a pulse-control signal corresponding to a PWM sinusoidal wave modulation method.

16. The motor-driving device according to claim 8, wherein the control-signal-generator unit generates a pulse-control signal corresponding to a PWM sinusoidal wave modulation method.

* * * * *